US012779545B2

(12) United States Patent
Suzuki

(10) Patent No.: US 12,779,545 B2
(45) Date of Patent: Nov. 3, 2026

(54) MACHINE TOOL AND CONTROL METHOD OF MACHINE TOOL

(71) Applicants: CITIZEN WATCH CO., LTD., Nishitokyo (JP); CITIZEN MACHINERY CO., LTD., Kitasaku-gun (JP)

(72) Inventor: Toshiyuki Suzuki, Kitasaku-gun (JP)

(73) Assignees: CITIZEN WATCH CO., LTD., Nishitokyo (JP); CITIZEN MACHINERY CO., LTD., Nagano (JP)

( * ) Notice: Subject to any disclaimer, the term of this patent is extended or adjusted under 35 U.S.C. 154(b) by 262 days.

(21) Appl. No.: 18/837,762

(22) PCT Filed: Feb. 7, 2023

(86) PCT No.: PCT/JP2023/003955

§ 371 (c)(1),
(2) Date: Aug. 12, 2024

(87) PCT Pub. No.: WO2023/181673

PCT Pub. Date: Sep. 28, 2023

(65) Prior Publication Data

US 2025/0178097 A1 Jun. 5, 2025

(30) Foreign Application Priority Data

Mar. 22, 2022 (JP) ................................ 2022-046079

(51) Int. Cl.

*B23B 13/12* (2006.01)
*B23B 25/06* (2006.01)
*G05B 19/18* (2006.01)

(52) U.S. Cl.

CPC ............ *B23B 25/06* (2013.01); *B23B 13/126* (2013.01); *B23B 2260/026* (2013.01); *G05B 19/18* (2013.01)

(58) Field of Classification Search

CPC ......... B23B 25/06; B23B 13/126; B23B 7/06; B23B 2231/26; B23B 2260/026; B23B 13/12; G05B 19/18

See application file for complete search history.

(56) References Cited

U.S. PATENT DOCUMENTS 5,320,009 A * 6/1994 Habegger ............ B23B 31/223 279/132
9,616,500 B2 * 4/2017 Yanakawa ............ B23Q 1/763
(Continued)

FOREIGN PATENT DOCUMENTS

JP H07328804 A 12/1995

*Primary Examiner* — Sara Addisu
(74) *Attorney, Agent, or Firm* — CANTOR COLBURN LLP

(57) ABSTRACT

A machine tool has a front spindle that rotatably holds a bar, a front spindle drive motor that rotationally drives the front spindle, an encoder that detects a rotation angle of the front spindle drive motor, a rotary guide bush that is installed on a guide bush support in front of the front spindle to support the bar extending from the front spindle while allowing the bar to rotate around a rotation axis and move in a rotation axis direction and rotate synchronously with the front spindle, a back spindle that is arranged opposite to the front spindle and rotatably holds the bar, a back spindle drive motor that rotationally drives the back spindle, and a controller that controls operations of the front spindle and the back spindle.

5 Claims, 13 Drawing Sheets

(56) References Cited

U.S. PATENT DOCUMENTS

| | | | | |
|---|---|---|---|---|
| 2014/0202294 A1* | 7/2014 | Takahashi | B23B 25/00 | |
| | | | 82/1.11 | |
| 2022/0161333 A1* | 5/2022 | Inoue | B23Q 17/12 | |
| 2022/0234112 A1* | 7/2022 | Suzuki | B23B 13/04 | |
| 2026/0042154 A1* | 2/2026 | Suzuki | B23B 25/06 | |

* cited by examiner

MACHINE TOOL AND CONTROL METHOD OF MACHINE TOOL

CROSS-REFERENCE TO RELATED APPLICATIONS

The present application is a national stage application of PCT/JP2023/003955 filed Feb. 7, 2023, and claims priority to Japanese Patent Application No. JP2022-046079 filed Mar. 22, 2022, the contents of which are incorporated by reference in their entirety.

TECHNICAL FIELD

The present invention relates to a machine tool that adjusts a gap between a bar and a rotary guide bush, and a control method of the machine tool.

SUMMARY

Conventionally, a machine tool has been known that includes a guide bush arranged in front of a spindle to support and guide a bar held by the spindle. In order to machine the bar stably and with high precision, it is necessary to adjust the size of the gap between the bar and the guide bush (that is, to adjust opening degree of the guide bush), and the technique for automatically adjusting the opening degree of the guide bush is known (for example, JP 07-328804 A).

The machine tool described in JP 07-328804 A uses an adjusting nut (also referred to as a draw bar) that is screwed with the guide bush when adjusting the opening degree of the guide bush. Here, in JP 07-328804 A, the guide bush does not rotate synchronously with the spindle. However, in order to prevent the bar from sticking to the guide bush and to prevent the bar from deteriorating surface properties thereof, even in a case of a rotary guide bush in which the guide bush rotates synchronously with the spindle, it is desirable to automatically adjust the gap between the rotary guide bush and the bar in order to machine the bar stably and with high precision.

According to one or more embodiments, in a case where the opening degree of the rotary guide bush is adjusted by an adjusting nut and the rotary guide bush rotates synchronously with the front spindle, the gap between the rotary guide bush and the bar may be automatically adjusted.

A machine tool according to one or more embodiments comprises a front spindle that rotatably holds a bar; a front spindle drive motor that rotationally drives the front spindle; an encoder that detects a rotation angle of the front spindle drive motor; a rotary guide bush that is installed on a guide bush support in front of the front spindle to support the bar extending from the front spindle while allowing the bar to rotate around a rotation axis and move in a rotation axis direction and rotates synchronously with the front spindle; a back spindle that is arranged opposite to the front spindle and rotatably holds the bar; a back spindle drive motor that rotationally drives the back spindle; and a control device that controls operations of the front spindle and the back spindle, wherein the rotary guide bush includes a guide bush holder that is fixed to the guide bush support; a guide bush main body that is rotatable relative to the guide bush holder and supports the bar while allowing the bar to rotate around the rotation axis and move in the rotation axis direction; and an adjusting nut that, when adjusting a gap between the bar and the guide bush main body, rotates the guide bush main body to adjust size of the gap and is screwed with the guide bush main body, and the control device includes a guide bush opening degree determining section that determines an adjustment amount of the gap based on a rotation angle of the front spindle when rotating the back spindle in a state where the bar is held by the back spindle and the front spindle drive motor is not excited.

According to one or more embodiments, the back spindle is capable of attaching and detaching a holding jig for holding the bar.

According to one or more embodiments, a rotating jig, which engages with the adjusting nut of the rotary guide bush facing the front spindle to rotate the adjusting nut, is mounted on the bar between the front spindle and the rotary guide bush.

A control method of a machine tool according to one or more embodiments comprises a front spindle that rotatably holds a bar; a front spindle drive motor that rotationally drives the front spindle; an encoder that detects a rotation angle of the front spindle drive motor; a rotary guide bush that is installed on a guide bush support in front of the front spindle to support the bar extending from the front spindle while allowing the bar to rotate around a rotation axis and move in a rotation axis direction and rotates synchronously with the front spindle; a back spindle that is arranged opposite to the front spindle and rotatably holds the bar; a back spindle drive motor that rotationally drives the back spindle; and a control device that controls operations of the front spindle and the back spindle, wherein the rotary guide bush includes a guide bush holder that is fixed to the guide bush support; a guide bush main body that is rotatable relative to the guide bush holder and supports the bar while allowing the bar to rotate around the rotation axis and move in the rotation axis direction; and an adjusting nut that, when adjusting a gap between the bar and the guide bush main body, rotates the guide bush main body to adjust size of the gap and is screwed with the guide bush main body, the control method comprising the steps of: holding the bar with the back spindle; rotating the back spindle around a rotation axis; measuring the rotation angle of the front spindle drive motor caused by rotating the back spindle with the encoder; determining an adjustment amount of the gap based on a rotation angle of the front spindle drive motor measured with the encoder; and rotating the guide bush main body relative to the adjusting nut by rotating the back spindle around a rotation axis so as to achieve the determined adjustment amount of the gap.

According to one or more embodiments, the control device includes the guide bush opening degree determining section that determines the adjustment amount of the gap based on the rotation angle of the front spindle when the back spindle is rotated in a state where the bar is held by the back spindle and where the front spindle drive motor is not excited. Thereby, the change in the rotation angle of the front spindle, which is rotatable when the back spindle holding the bar is rotationally driven, is based only on the rotation of the bar accompanying the rotational drive of the back spindle. Thus, the SN ratio is improved compared to the case where the size of the gap between the rotary guide bush and the bar is adjusted based on the load of the back spindle drive motor when the back spindle holding the bar is rotationally driven by the back spindle drive motor, and in the case where the opening degree of the rotary guide bush is adjusted by the adjusting nut and the rotary guide bush rotates synchronously with the front spindle, the gap between the rotary guide bush and the bar can be automatically adjusted with high precision.

According to one or more embodiments, the holding jig for holding the bar is detachably mounted on the back spindle. Thereby, the holding jig mounted on the back spindle holds the bar. Thus, even if the back spindle cannot directly hold the bar, the bar can be indirectly held by the back spindle by selecting the holding jig corresponding to the bar.

According to one or more embodiments, the rotating jig that engages with the adjusting nut of the rotary guide bush facing the front spindle and rotates the adjusting nut is mounted on the bar between the front spindle and the rotary guide bush. Thereby, in a state where the bar is held by the back spindle and the rotating jig is engaged with the adjusting nut, the back spindle rotates the bar to rotate the adjusting nut of the rotary guide bush. Thus, the gap between the rotary guide bush and the bar can be automatically adjusted with high precision.

According to one or more embodiments, the control method comprises the steps of: measuring the rotation angle of the front spindle drive motor caused by rotating the back spindle with the encoder; determining an adjustment amount of the gap based on a rotation angle of the front spindle drive motor measured with the encoder; and rotating the guide bush main body relative to the adjusting nut by rotating the back spindle around a rotation axis so as to achieve the determined adjustment amount of the gap. Thereby, the change in the rotation angle of the front spindle, which is rotatable when the back spindle holding the bar is rotationally driven, is based only on the rotation of the bar accompanying the rotational drive of the back spindle. Thus, the SN ratio is improved compared to the case where the size of the gap between the rotary guide bush and the bar is adjusted based on the load of the back spindle drive motor when the back spindle holding the bar is rotationally driven by the back spindle drive motor, and in the case where the opening degree of the rotary guide bush is adjusted by the adjusting nut and the rotary guide bush rotates synchronously with the front spindle, the gap between the rotary guide bush and the bar can be automatically adjusted with high precision.

DETAILED DESCRIPTION

Figure 1:
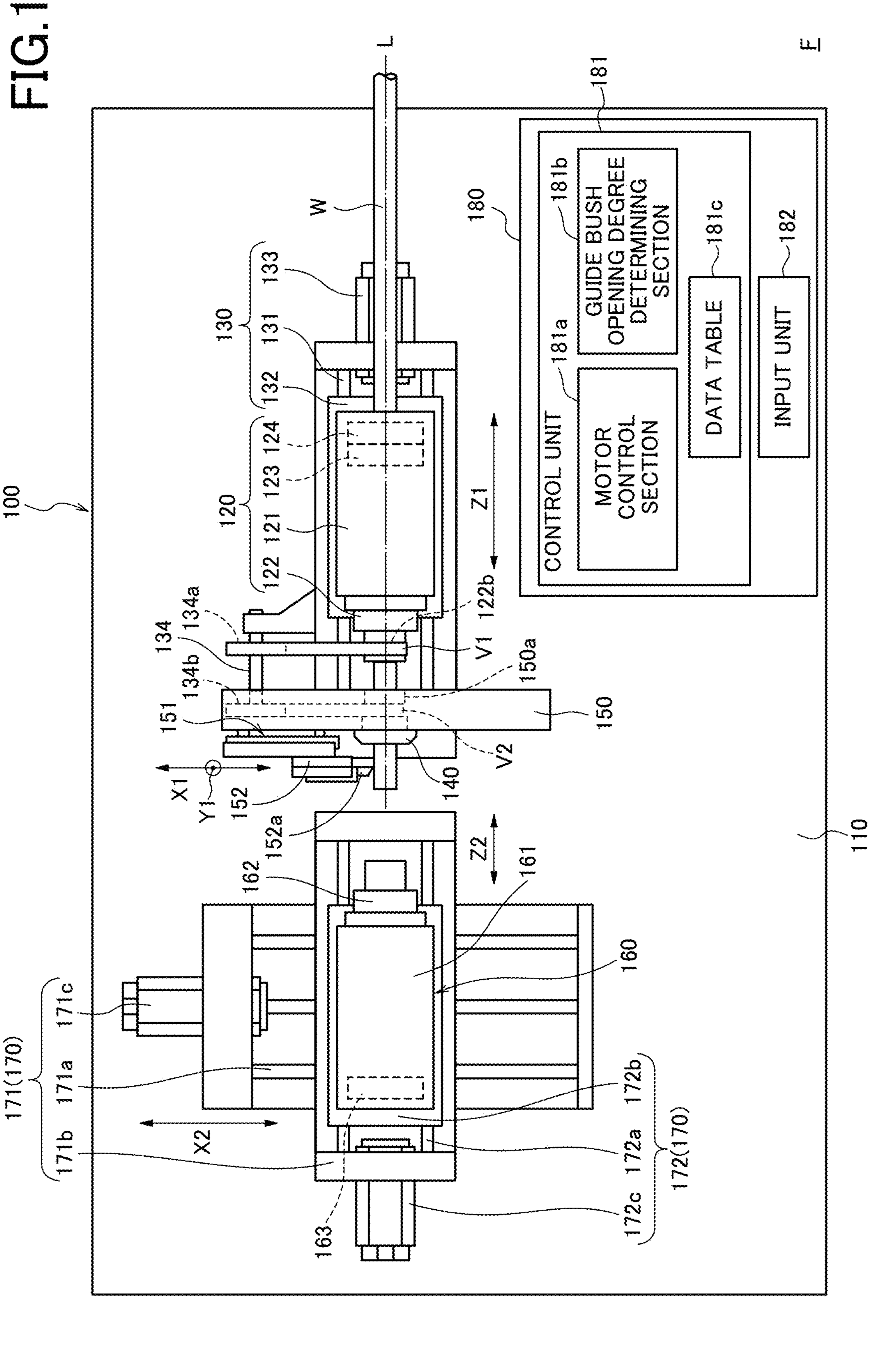
FIG. 1 is a schematic configuration diagram of an automatic lathe in an example of a machine tool according to one or more embodiments.

Embodiments of the present disclosure will be described below with reference to the drawings. However, the embodiments are merely exemplary, and are not intended to limit the scope of the claims. A machine tool according to one or more embodiments comprises: a front spindle that rotatably holds a bar; a front spindle drive motor that rotationally drives the front spindle; an encoder that detects a rotation angle of the front spindle drive motor; a rotary guide bush that is installed on a guide bush support in front of the front spindle to support the bar extending from the front spindle while allowing the bar to rotate around a rotation axis and move in a rotation axis direction and rotates synchronously with the front spindle; a back spindle that is arranged opposite to the front spindle and rotatably holds the bar; a back spindle drive motor that rotationally drives the back spindle; and a control device that controls operations of the front spindle and the back spindle, wherein the rotary guide bush includes a guide bush holder that is fixed to the guide bush support; a guide bush main body that is rotatable relative to the guide bush holder and supports the bar while allowing the bar to rotate around the rotation axis and move in the rotation axis direction; and an adjusting nut that, when adjusting a gap between the bar and the guide bush main body, rotates the guide bush main body to adjust size of the gap and is screwed with the guide bush main body, and the control device includes a guide bush opening degree determining section that determines an adjustment amount of the gap based on a rotation angle of the front spindle when rotating the back spindle in a state where the bar is held by the back spindle and the front spindle drive motor is not excited, so that the gap between the rotary guide bush and the bar is automatically adjusted.

Further, a control method of a machine tool according to one or more embodiments comprises: a front spindle that rotatably holds a bar; a front spindle drive motor that rotationally drives the front spindle; an encoder that detects a rotation angle of the front spindle drive motor; a rotary guide bush that is installed on a guide bush support in front of the front spindle to support the bar extending from the front spindle while allowing the bar to rotate around a rotation axis and move in a rotation axis direction and rotates synchronously with the front spindle; a back spindle that is arranged opposite to the front spindle and rotatably holds the bar; a back spindle drive motor that rotationally drives the back spindle; and a control device that controls operations of the front spindle and the back spindle, wherein the rotary guide bush includes a guide bush holder that is fixed to the guide bush support; a guide bush main body that is rotatable relative to the guide bush holder and supports the bar while allowing the bar to rotate around the rotation axis and move in the rotation axis direction; and an adjusting nut that, when adjusting a gap between the bar and the guide bush main body, rotates the guide bush main body to adjust size of the gap and is screwed with the guide bush main body, the control method comprising the steps of: holding the bar with the back spindle; rotating the back spindle around a rotation axis; measuring the rotation angle of the front spindle drive motor caused by rotating the back spindle with the encoder; determining an adjustment amount of the gap based on a rotation angle of the front spindle drive motor measured with the encoder; and rotating the guide bush main body relative to the adjusting nut by rotating the back spindle around a rotation axis so as to achieve the determined adjustment amount of the gap, so that the gap between the rotary guide bush and the bar is automatically adjusted.

Hereinafter, a machine tool 100 according to an example will be described based on FIGS. 1 to 10B.

<1. Overview of Machine Tool>

First, an overview of the machine tool 100 will be explained based on FIGS. 1 to 5. FIG. 1 is a schematic configuration diagram of an automatic lathe in an example of a machine tool according to one or more embodiments.

The machine tool 100 is an automatic lathe, and as shown in FIG. 1, includes a bed 110 placed on a floor F and having a rectangular shape in plan view. Hereinafter, the direction perpendicular to the bed 110 will be referred to as the "Y direction", the longitudinal direction of the bed 110 in plan view will be referred to as the "Z direction" and the lateral direction of the bed 110 in plan view will be referred to as the "X direction".

On the bed 110, there are placed a front spindle 120 that rotatably holds a bar W, a front spindle feeding mechanism 130 that feeds the front spindle 120 in the Z1 direction parallel to the Z direction, a rotary guide bush 140 that supports the bar W extending from the front spindle 120 while allowing the bar W to rotate around a rotation axis L and move in the rotation axis L direction, a guide bush support 150 that is installed in front of the front spindle 120 and supports the rotary guide bush 140, a back spindle 160 that is arranged opposite to the front spindle 120 and the rotary guide bush 140 and rotatably holds the bar W, and a back spindle feeding mechanism 170 that feeds the back spindle 160 in the Z2 direction parallel to the Z direction and in the X2 direction parallel to the X direction.

Here, the front spindle 120 and the bar W are movable in the Z1 direction, and "forward" for the front spindle 120 and the bar W means the direction in which the front spindle 120 and the bar W approach the back spindle 160, and "backward" for the front spindle 120 and the bar W means the direction in which the front spindle 120 and the bar W move away from the back spindle 160. Further, "forward" for the rotary guide bush 140 means the direction in which the rotary guide bush 140 approaches the back spindle 160, and "backward" for the rotary guide bush 140 means the direction in which the rotary guide bush 140 moves away from the back spindle 160. The back spindle 160 is movable in the X2 direction and also in the Z2 direction, and "forward" for the back spindle 160 means the direction in which the back spindle 160 approaches the front spindle 120, and "backward" for the back spindle 160 means the direction in which the back spindle 160 moves away from the front spindle 120.

The bar W to be machined by the machine tool 100 is a long round-shaped workpiece, supplied from the rear end of the front spindle 120 using a push arrow of a bar feeder (not shown), rotatably supported around the rotation axis L via the front spindle 120 by the rotary guide bush 140 and fed toward the back spindle 160. A finger chuck that grips the rear end of the bar W is provided at the tip of the push arrow of the bar feeder.

The machine tool 100 also includes a control device 180 that controls operations of the front spindle 120 and the back spindle 160.

<2. Machine Tool Components>

Figure 2:
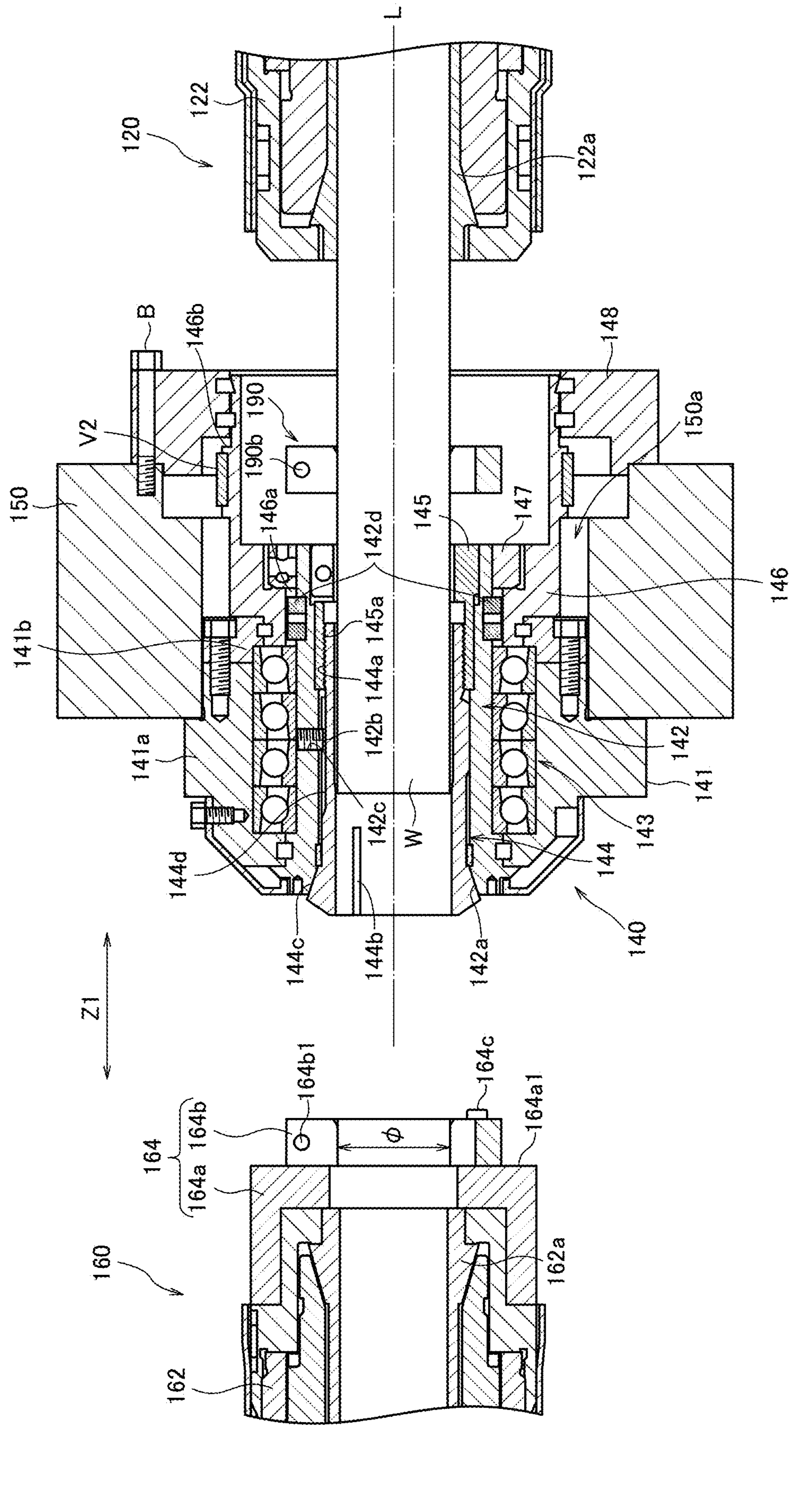
FIG. 2 is a configuration diagram of a rotary guide bush, a front spindle and a back spindle.
Figure 3:
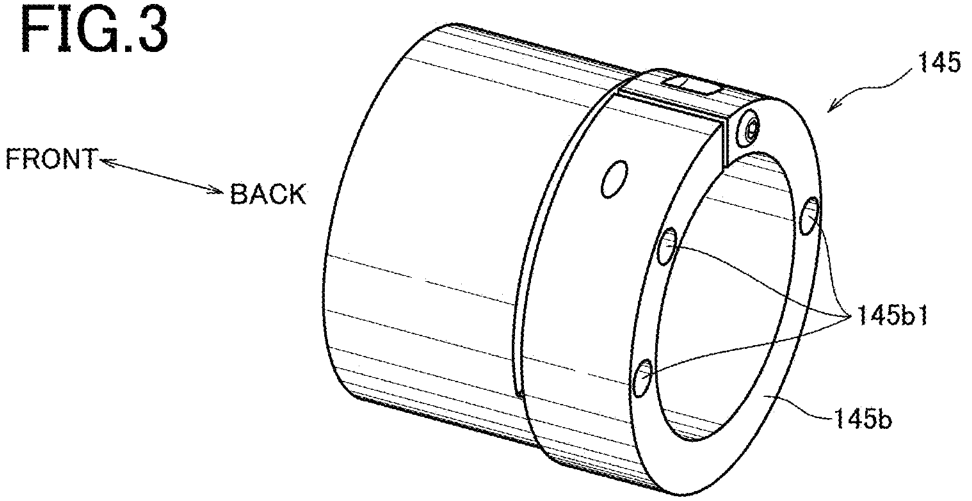
FIG. 3 is a perspective view of an adjusting nut shown in FIG. 2.
Figure 4:
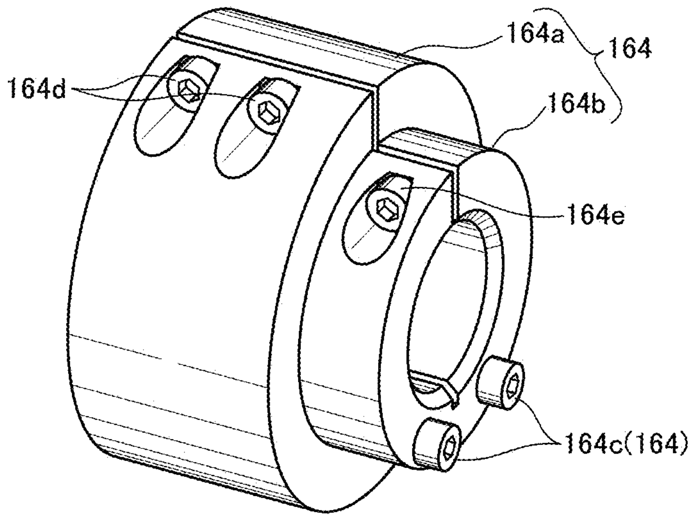
FIG. 4 is a perspective view of a holding jig shown in FIG. 2.
Figure 5:
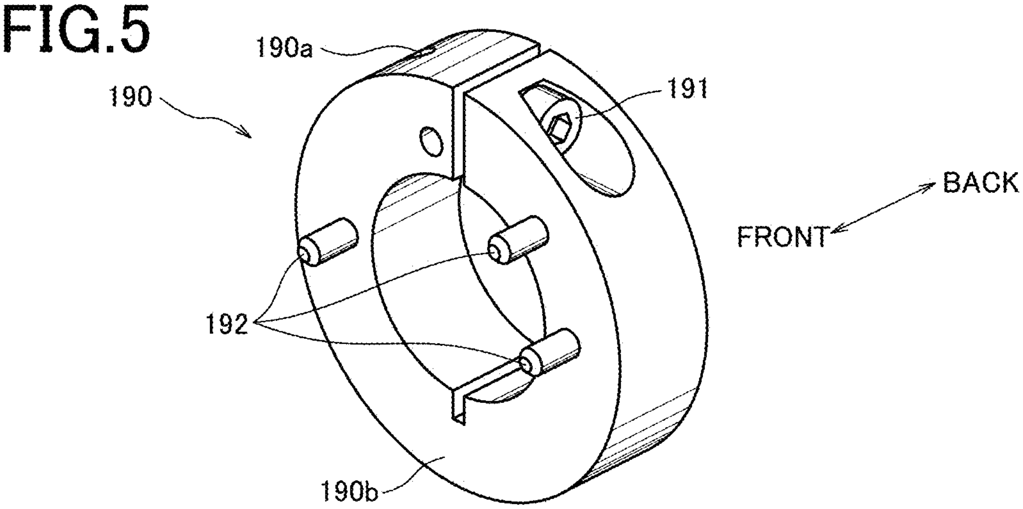
FIG. 5 is a perspective view of a rotating jig shown in FIG. 2.

Next, each component of the machine tool 100 described above will be explained in detail based on FIGS. 1 to 5. FIG. 2 is a configuration diagram of a rotary guide bush, a front spindle and a back spindle, FIG. 3 is a perspective view of an adjusting shown in FIG. 2, FIG. 4 is a perspective view of a holding jig shown in FIG. 2, and FIG. 5 is a perspective view of a rotating jig shown in FIG. 2.

<2.1 Front Spindle>

As shown in FIG. 1, the front spindle 120 includes a spindle headstock 121 that is mounted on the front spindle feeding mechanism 130 and is movable in the Z1 direction, a front spindle main body 122 that is rotatably supported by the spindle headstock 121, a front spindle drive motor 123 that rotationally drives the front spindle main body 122, and an encoder 124 that detects the rotation angle of the front spindle drive motor 123.

The front spindle main body 122 is supported by the spindle headstock 121 with the axis thereof being in the Z1 direction shown in FIG. 1 and is capable of gripping (holding) the bar W rotatably around the rotation axis L via a chuck 122*a* as shown in FIG. 2. The chuck 122*a* is arranged concentrically with the front spindle main body 122 and rotates together with the front spindle main body 122. That is, the rotation axis L of the bar W coincides with the rotation center of the front spindle 120.

Further, as shown in FIG. 1, a timing pulley 122*b* around which a timing belt V1 is wound is provided at the front end portion of the front spindle main body 122.

The front spindle drive motor 123 is a so-called "electric motor" that has a stator and a rotor, generates a magnetic field by changing the rotation of either of them, and generates a driving force by changing the magnetic field.

<2.2 Front Spindle Feeding Mechanism>

The front spindle feeding mechanism 130 includes a Z1 rail 131 fixed to the bed 110 and extending in the Z1 direction, a Z1 slider 132 mounted on the Z1 rail 131 and slidable along the Z1 direction, and a Z1 motor 133 that slides the Z1 slider 132. The spindle headstock 121 of the front spindle 120 is installed on the Z1 slider 132.

Further, the front spindle feeding mechanism 130 is provided with a rotatable counter shaft 134. On the counter shaft 134, a spindle side timing pulley 134*a*, around which the timing belt V1 is wound, and a rotary guide bush side timing pulley 134*b*, around which a timing belt V2 is wound, are mounted. Therefore, when the front spindle main body 122 is rotationally driven by the front spindle drive motor 123, the counter shaft 134 is rotated via the timing belt V1.

<2.3 Rotary Guide Bush>

As shown in FIG. 1, the rotary guide bush 140 is inserted into the guide bush support 150 that includes a rotary guide bush insertion hole 150*a* concentric with the front spindle 120.

Further, as shown in FIG. 2, the rotary guide bush 140 includes a hollow cylindrical guide bush holder 141 that is inserted and fixed into the rotary guide bush insertion hole 150*a* of the guide bush support 150, a guide bush sleeve 142 that is inserted into the guide bush holder 141, a bearing 143 that is arranged between the guide bush bolder 141 and the guide bush sleeve 142 and rotatably supports the guide bush sleeve 142 relative to the guide bush holder 141, a cylindrical guide bush main body 144 that is inserted into the guide bush sleeve 142, an adjusting nut 145 that is screwed with a male thread 144*a* formed at the rear end portion of the guide bush main body 144, a timing pulley 146 that is inserted into the rear end side of the guide bush holder 141 and is rotatable relative to the guide bush holder 141, a retaining nut 147 that engages with the guide bush sleeve 142 to prevent the timing pulley 146 from coming off from the guide bush holder 141, and a flange 148 that is fixed to the guide bush support 150 and prevents the timing pulley 146 from coming off from the guide bush holder 141.

The guide bush holder 141 includes a hollow cylindrical guide bush holder main body 141*a* that is inserted into the rotary guide bush insertion hole 150*a* of the guide bush support 150, and an annular bearing retainer 141*b* that is mounted on the rear end side of the guide bush holder main body 141*a* and positions the bearing 143 in the forward and back direction together with the guide bush holder main body 141*a*.

A taper 142*a*, whose inner diameter gradually decreases toward the back, is formed on the inner peripheral side of the front end portion of the guide bush sleeve 142. Further, a through screw hole 142*c* into which a set screw 142*b* is screwed is formed in the guide bush sleeve 142 in the radial direction. Furthermore, a key 142*d* that engages with the timing pulley 146 is embedded in the outer peripheral side of the rear end portion of the guide bush sleeve 142.

As shown in FIG. 2, the guide bush main body 144 supports and guides the bar W held by the front spindle 120 so as to allow the bar W to rotate around the rotation axis L and move in the rotation axis L direction. A slot 144*b* extending in the Z direction is formed in the front end portion of the guide bush main body 144.

Further, a taper 144*c*, whose outer diameter gradually decreases toward the back, corresponding to the taper angle of the taper 142*a* of the guide bush sleeve 142 is formed on the outer peripheral side of the front end portion of the guide bush main body 144. A groove 144*d* extending backward is formed at the back of the taper 144*c*. The groove 144*d* is formed to become gradually deeper toward the back and extends until the groove 144*d* reaches the male thread 144*a*.

Further, the set screw 142*b* screwed into the through screw hole 142*c* of the guide bush sleeve 142 is inserted into the groove 144*d*. Therefore, the set screw 142*b* engages with the groove 144*d*, so that the guide bush main body 144 can be moved forward and backward relative to the guide bush sleeve 142 only in the Z direction, and the guide bush main body 144 can be rotated around the rotation axis L together with the guide bush sleeve 142. That is, if the set screw 142*b* engages with the groove 144*d*, the guide bush main body 144 becomes rotatable relative to the guide bush holder 141.

The adjusting nut 145 (also referred to as a draw bar) has a hollow cylindrical shape, is provided at the back of the guide bush main body 144 and is rotatable relative to the guide bush sleeve 142. As shown in FIG. 2, a female thread 145*a* with a predetermined pitch is formed on the inner peripheral side of the front end portion of the adjusting nut 145, and the female thread 145*a* is screwed with the male thread 144*a* formed at the rear end portion of the guide bush main body 144.

Therefore, by rotating the adjusting nut 145 around the rotation axis L, the guide bush main body 144 moves forward and backward relative to the guide bush sleeve 142. When the guide bush main body 144 moves backward relative to the guide bush sleeve 142, the taper 144*c* is pushed by the taper 142*a*, and the front end portion of the guide bush main body 144 is bent toward the bar W side by the slot 144*b*, so that the opening degree of the front end portion of the guide bush main body 144 becomes smaller. On the other hand, when the guide bush main body 144 moves forward relative to the guide bush sleeve 142, the pressure by the taper 142*a* is released and the front end portion of the guide bush main body 144 expands outward, so that the opening degree of the front end portion of the guide bush main body 144 becomes larger.

That is, the amount of displacement of the guide bush main body 144 in the present example (that is same as the opening degree of the rotary guide bush 140 and the opening degree of the front end portion of the guide bush main body 144) is determined by the rotation amount relative to the adjusting nut 145. In other words, when adjusting the gap between the bar W and the guide bush main body 144, the adjusting nut 145 can rotate the guide bush main body 144 to adjust the size of the gap.

Further, as shown in FIG. 3, a plurality of (for example, three) engagement holes 145*b*1 are formed in a back surface 145*b* of the adjusting nut 145.

The timing pulley 146 has a cylindrical shape and is rotatably inserted into the rear end side of the bearing retainer 141*b* of the guide bush holder 141 as shown in FIG. 2.

A key groove 146*a* that engages with the key 142*d* of the guide bush sleeve 142 is formed on the inner peripheral side of the front end portion of the timing pulley 146. Further, a belt positioning groove 146*b* is formed on the outer periphery of the timing pulley 146, and the timing belt V2 is wound around the belt positioning groove 146*b*.

Therefore, when the front spindle main body 122 rotates, the counter shaft 134 also rotates due to the timing belt V1, and the rotary guide bush side timing pulley 134*b* also rotates, thus the timing pulley 146 of the rotary guide bush 140 rotates via the timing belt V2, the guide bush sleeve 142 rotates via the key 142*d*, and the guide bush main body 144 rotates via the set screw 142*b*. That is, the guide bush main body 144 rotates synchronously with the front spindle 120, that is, rotates around the rotation axis L at the same rotational speed as that of the front spindle 120.

A female thread formed on the inner peripheral side of the retaining nut 147 is screwed with a male thread formed on the outer peripheral side of the rear end portion of the guide bush sleeve 142. This screwing connection of the female thread of the retaining nut 147 and the male thread of the guide bush sleeve 142 prevents the timing pulley 146 from coming off from backward, as shown in FIG. 2.

The flange 148 is an annular member, and, as shown in FIG. 2, is fixed to the guide bush support 150 with a fixing bolt B.

<2.4 Guide Bush Support>

The guide bush support 150 is fixed to the bed 110. As shown in FIG. 1, the guide bush support 150 accommodates the rotary guide bush side timing pulley 134*b* therein attached to the tip of the counter shaft 134 of the front spindle feeding mechanism 130.

Further, a tool rest moving mechanism 151 on which a tool rest 152 is placed is provided on the back spindle 160 side of the guide bush support 150. The tool rest moving mechanism 151 is capable of moving the tool rest 152 in the X direction and the Y direction. A cutting tool 152*a* is mounted on the tool rest 152 with the tip of the cutting tool 152*a* facing the rotation axis L. Therefore, by moving the front spindle 120 in the rotation axis L direction and moving the tool rest 152 in the X direction or the Y direction, the bar W can be machined with the cutting tool 152*a*.

<2.5 Back Spindle>

As shown in FIG. 1, the back spindle 160 includes a spindle headstock 161 that is mounted on the back spindle feeding mechanism 170 and is movable in the Z2 direction and the X2 direction, a back spindle main body 162 that is rotatably supported by the spindle headstock 161, and a back spindle drive motor 163 that rotationally drives the back spindle main body 162.

The back spindle main body 162 is supported by the spindle headstock 161 with the axis thereof being in the Z2 direction parallel to the Z1 direction shown in FIG. 1 and can rotatably grips (holds) the bar W via a chuck 162*a* as shown in FIG. 2. The chuck 162*a* is configured concentrically with the back spindle main body 162 and is rotatable integrally with the back spindle main body 162.

As shown in FIG. 2, a holding jig 164 for holding the bar W is detachably attached to the chuck 162*a*. As shown in FIGS. 2 and 4, the holding jig 164 is composed of a C-shaped annular spindle mounting tool 164*a* attached to the back spindle main body 162, and a C-shaped annular bar holder 164*b* for holding the bar W, and a connecting bolt 164*c* for connecting the spindle mounting tool 164*a* and the bar holder 164*b*, and the holding jig 164 is C-shaped when viewed from the front spindle 120 side.

As shown in FIG. 2, the spindle mounting tool 164*a* has an inner diameter that is approximately equal to the outer diameter of the back spindle main body 162. Further, as shown in FIG. 4, The spindle mounting tool 164*a* is tightened to the back spindle main body 162 by inserting a tightening bolt 164*d* into a through hole, which is formed in a direction perpendicular to the circumferential direction of the spindle mounting tool 164*a*, and screwing the tightening bolt 164*d* into a screw hole facing the through hole. Thereby, the spindle mounting tool 164*a* rotates integrally with the back spindle main body 162.

A through hole extending in the Z2 direction is formed in the bar holder 164*b*. The bar holder 164*b* is integrated with the spindle mounting tool 164*a* by inserting the connecting bolt 164*c* through this through hole and screwing the connecting bolt 164*c* into a screw hole formed in a front surface 164*a*1 of the spindle mounting tool 164*a*. Further, since the bar holder 164*b* is a C-shaped ring, the inner diameter φ of the bar holder 164*b* is variable as shown in FIG. 2. The inner diameter of the bar holder 164*b* is adjusted by inserting an adjusting bolt 164*e* into a through hole formed in the direction perpendicular to the circumferential direction of the bar holder 164*b* and screwing the adjusting bolt 164*e* into a screw hole 164*b*1 facing the through hole.

<2.6 Back Spindle Feeding Mechanism>

As shown in FIG. 1, the back spindle feeding mechanism 170 is composed of an X2 direction feeding structure 171 that is placed on the bed 110 and a Z2 direction feeding structure 172 that is placed on the X2 direction feeding structure 171.

The X2 direction feeding structure 171 includes an X2 rail 171*a* that is fixed to the bed 110 and extends in the X2 direction, an X2 slider 171*b* that is mounted on the X2 rail 171*a* and is slidable along the X2 direction, and an X2 motor 171*c* that slides the X2 slider 171*b*.

The Z2 direction feeding structure 172 includes a Z2 rail 172*a* that is fixed to the X2 slider 171*b* and extends in the Z2 direction, a Z2 slider 172*b* that is mounted on the Z2 rail 172*a* and slidable along the Z2 direction, and a Z2 motor 172*c* that slides the Z2 slider 172*b*. The spindle headstock 161 of the back spindle 160 is installed on the Z2 slider 172*b*.

<2.7 Control Device>

The rotation of the front spindle 120 and the back spindle 160 and the movement of the front spindle feeding mechanism 130 and the back spindle feeding mechanism 170 are controlled by the control device 180. The control device 180 includes a control unit 181 and an input unit 182, which are connected via a bus.

The control unit 181 includes a CPU, a memory and the like, loads various programs and data stored in, for example, a ROM into a RAM, and executes the programs. That is, the operation of the machine tool 100 is controlled by a program loaded into the control unit 181. The rotation of the front spindle 120 and the back spindle 160, the movement of the front spindle feeding mechanism 130 and the back spindle feeding mechanism 170 and the like can be set by a program or input to the input unit 182.

Further, the control unit 181 includes a motor control section 181*a*, a guide bush opening degree determining section 181*b* and a data table 181*c*. For example, when adjusting the gap between the bar W and the rotary guide bush 140 (that is, the guide bush main body 144), the motor control section 181*a* controls the operations of the front spindle drive motor 123, the back spindle drive motor 163, and the Z2 motor 172*c*. The guide bush opening degree determining section 181*b* determines the adjustment amount of the gap between the bar W and the guide bush main body 144 based on the rotation angle of the front spindle drive motor 123 measured with the encoder 124 and with reference to the data table 181*c*. More specifically, the guide bush opening degree determining section 181*b* estimates the size of the gap between the bar W and the guide bush main body 144 based on the rotation angle of the front spindle drive motor 123, calculates the difference between this estimated size of the gap and the optimal size of the gap, and determines the rotation amount of the back spindle 160, that is the adjustment amount of the gap between the bar W and the guide bush main body 144, based on the difference. The data table 181*c* stores correspondence data, which depends on the material, diameter and the like of the bar W, between the rotation angle of the front spindle drive motor 123 and the size of the gap between the bar W and the guide bush main body 144.

<2.8 Rotating Jig>

As shown in FIG. 2, the machine tool 100 includes a rotating jig 190 that rotates the adjusting nut 145 for adjusting the size of the gap between the bar W and the guide bush main body 144.

The rotating jig 190 has a C-shaped annular shape as shown in FIG. 5, and the bar W is inserted therein as shown in FIG. 2. The rotating jig 190 has a variable inner diameter, similar to the bar holder 164*b*. The inner diameter of the rotating jig 190 is adjusted by inserting a tightening bolt 191 into a through hole formed in the direction perpendicular to the circumferential direction of the rotating jig 190 and screwing the tightening bolt 191 into a screw hole 190*a* facing the through hole.

Further, an engagement pin 192 that engages with the engagement hole 145*b*1 of the adjusting nut 145 of the rotary guide bush 140 is arranged on a front surface 190*b* of the rotating jig 190.

<3. Gap Adjustment Procedure>

Figure 6A:
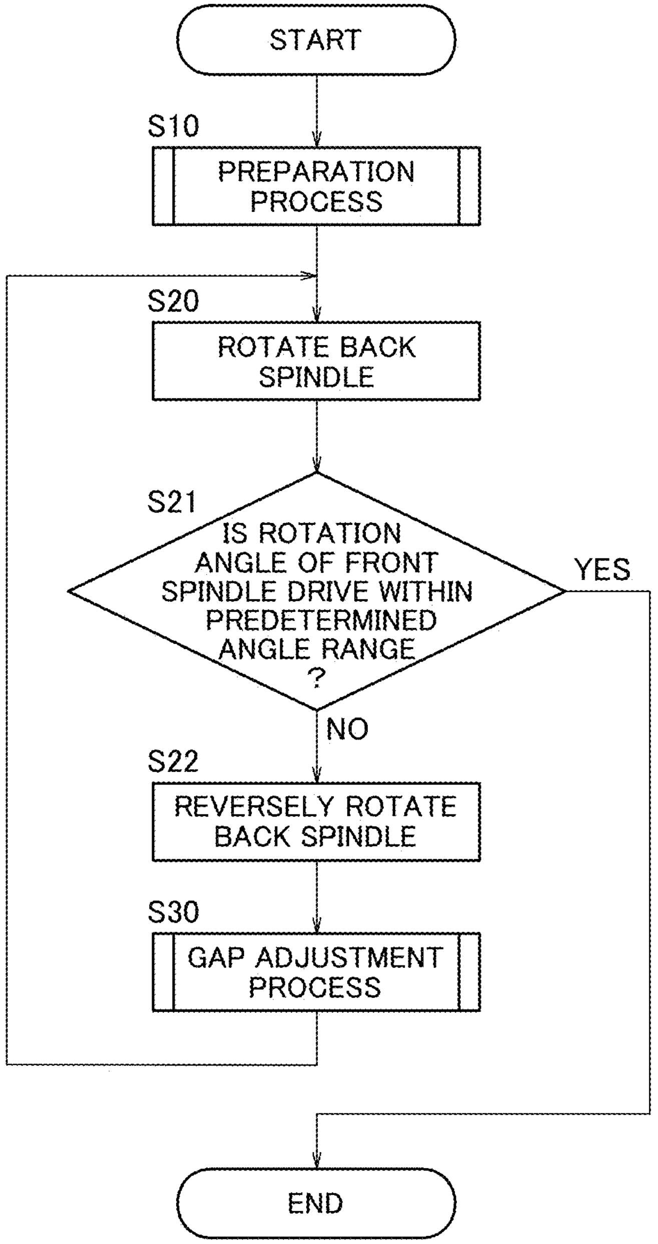
FIG. 6A is a flowchart showing a procedure for adjusting size of a gap between a bar and the rotary guide bush.
Figure 6B:
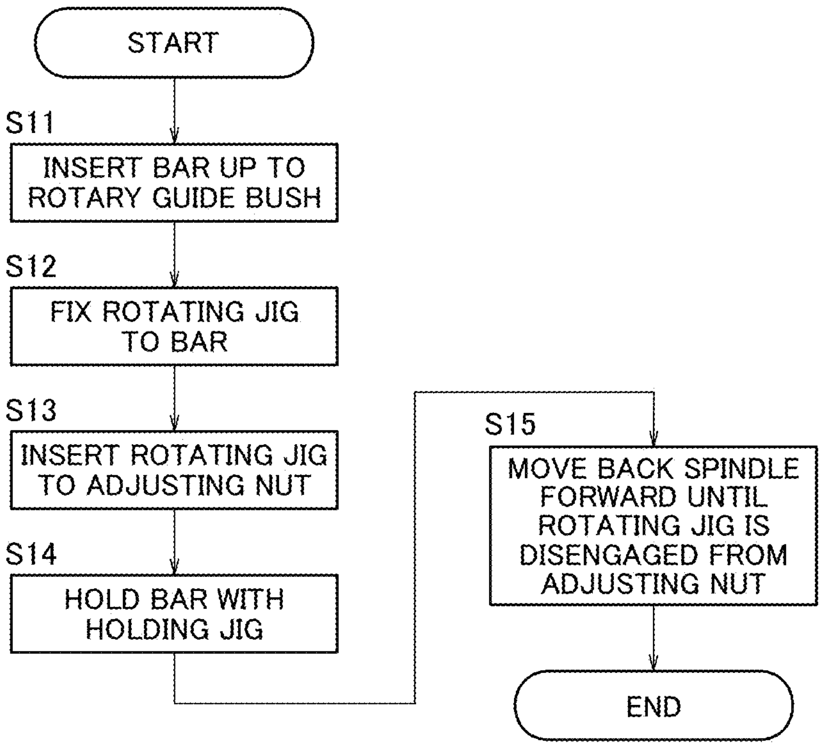
FIG. 6B is a flowchart showing a preparation process shown in FIG. 6A.
Figure 6C:
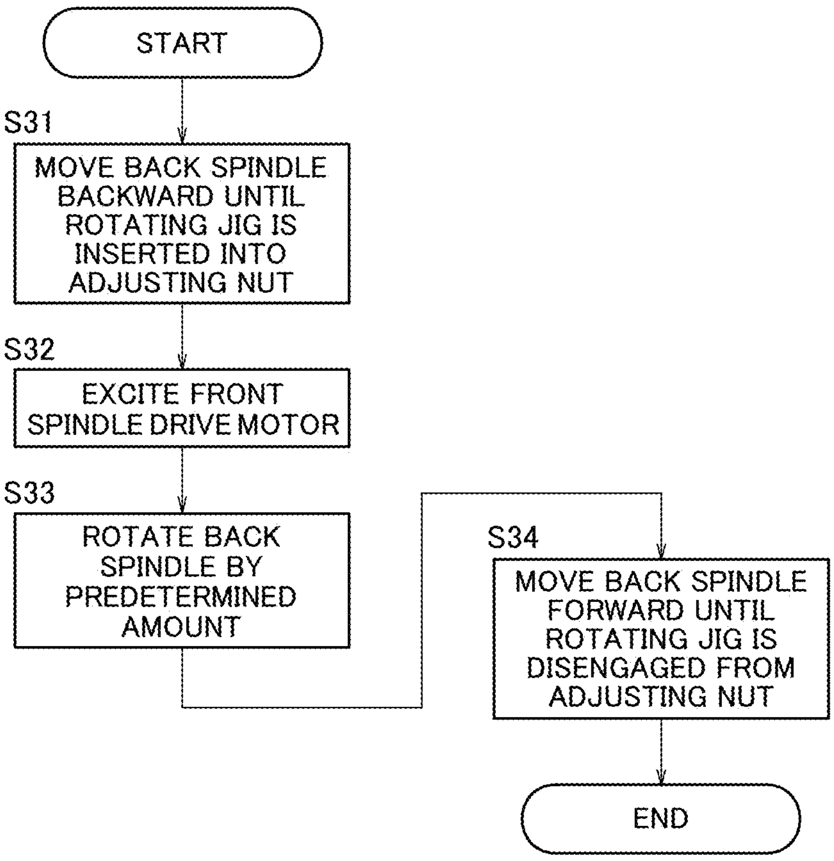
FIG. 6C is a flowchart showing a gap adjusting process shown in FIG. 6A.
Figure 7A:
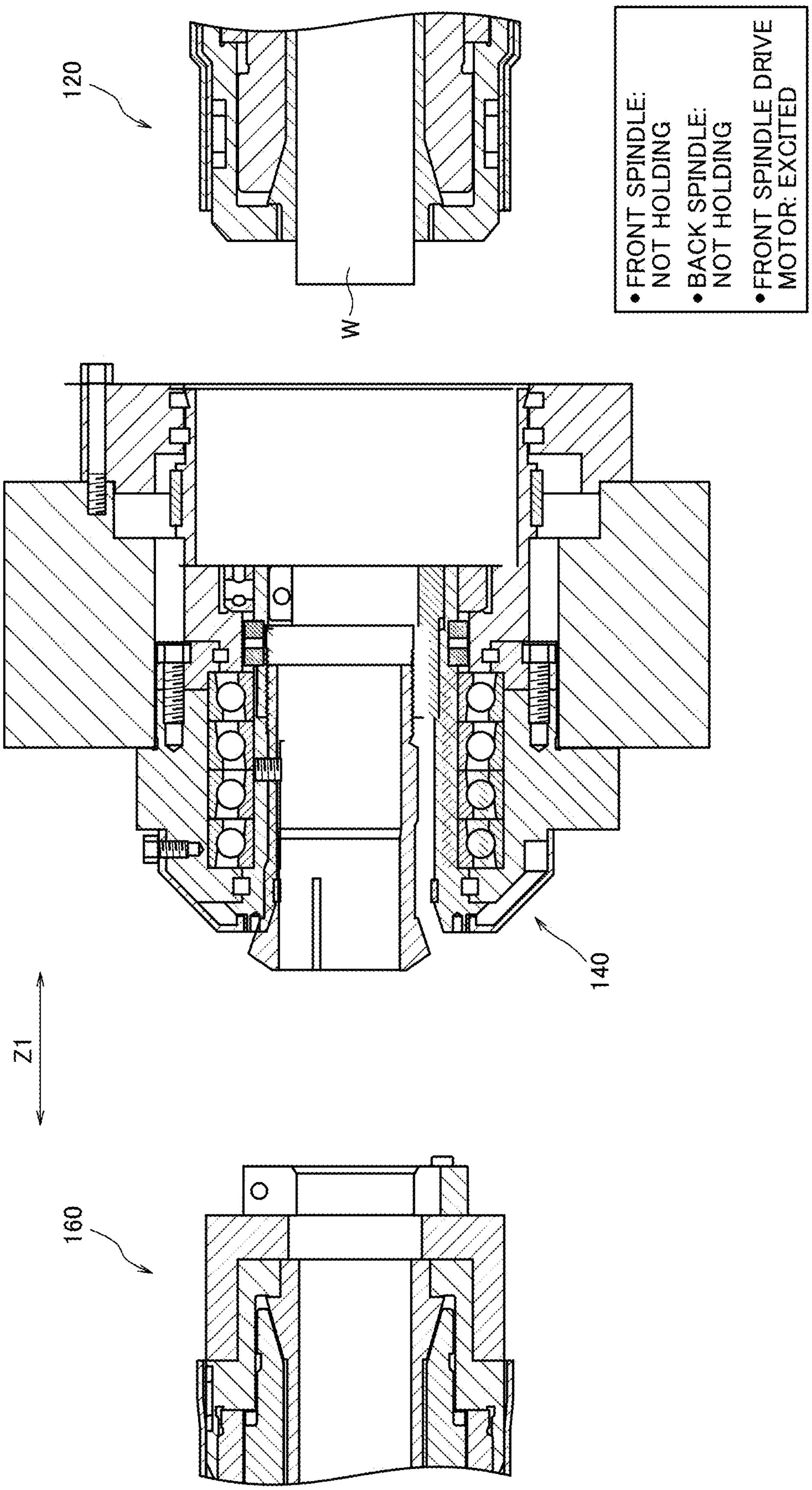
FIG. 7A is a schematic diagram showing a state in which the bar is inserted into the front spindle.
Figure 7B:
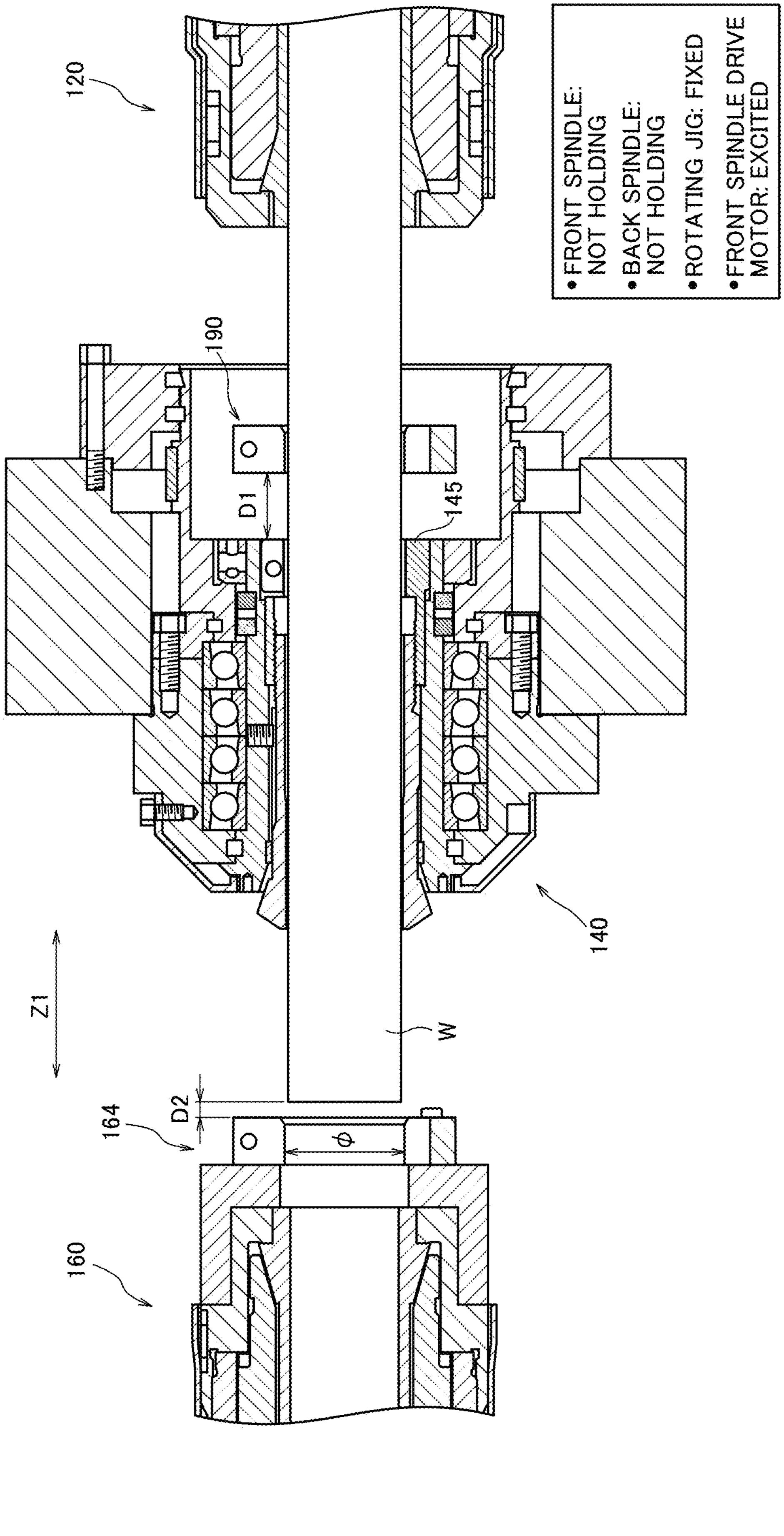
FIG. 7B is a schematic diagram showing a state in which the bar is inserted up to the rotary guide bush.
Figure 7C:
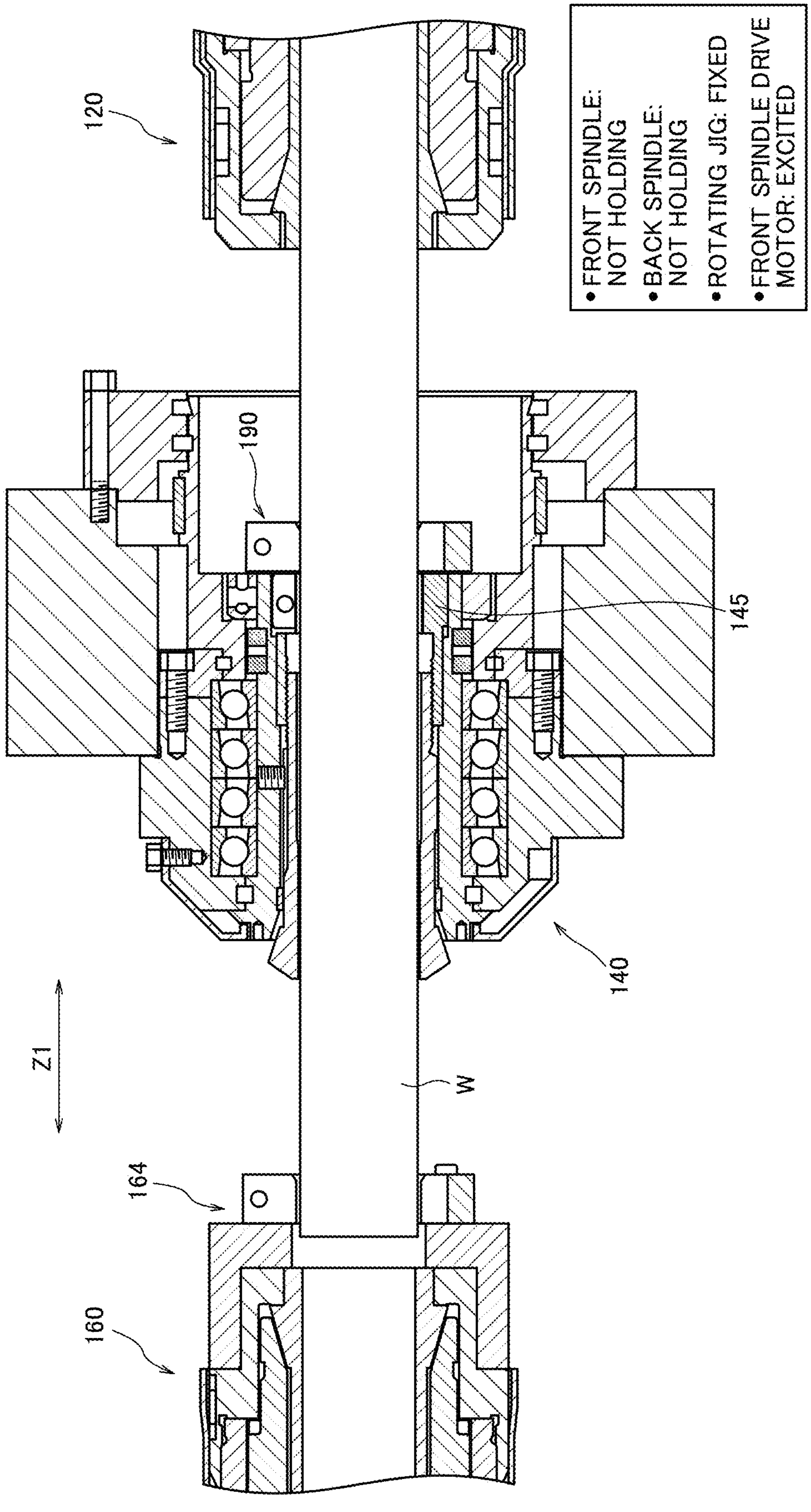
FIG. 7C is a schematic diagram showing a state in which the front spindle is moved forward and the rotating jig and an adjusting nut are engaged.
Figure 8:
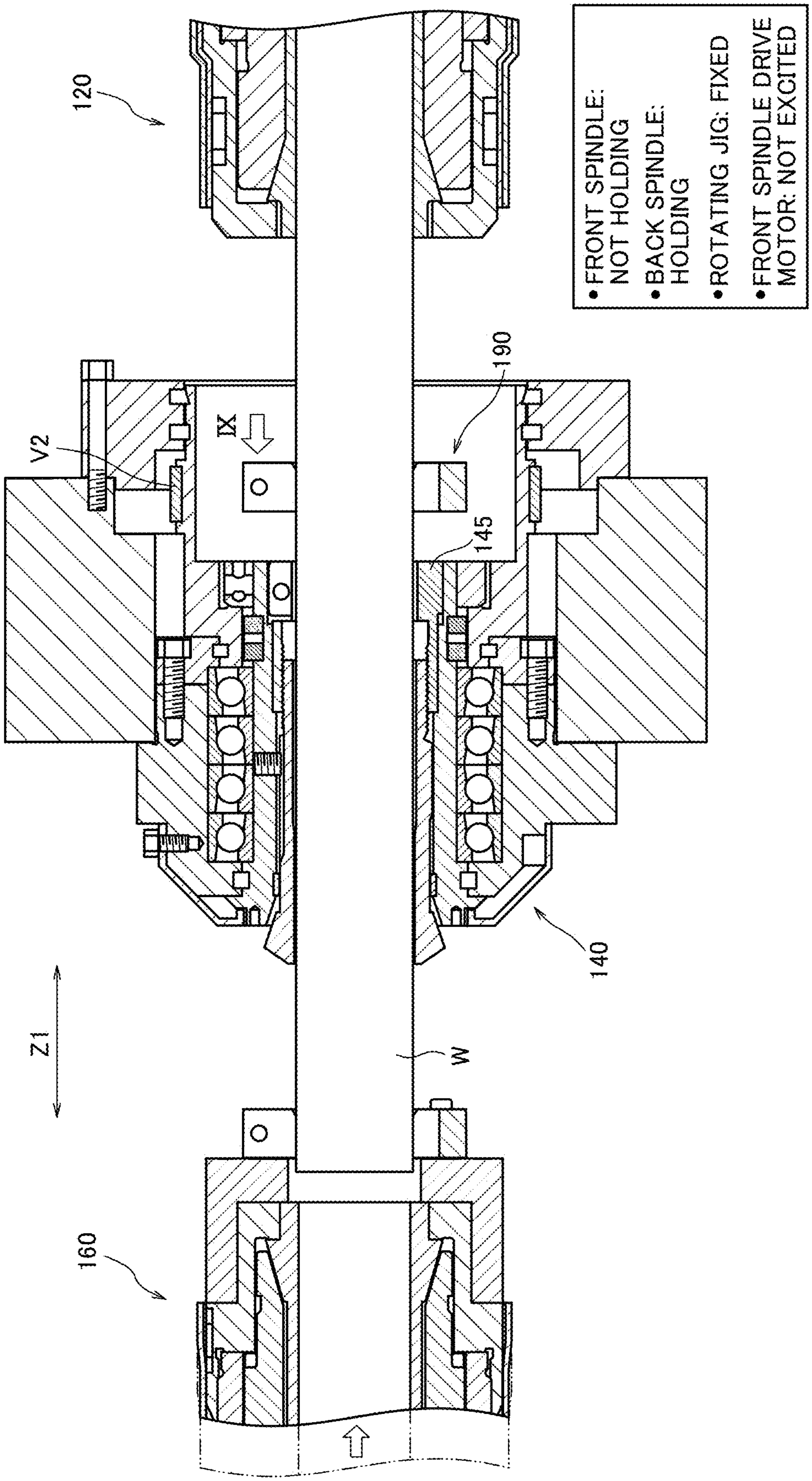
FIG. 8 is a schematic diagram showing a state in which the rotating jig and the adjusting nut are disengaged.
Figure 9:
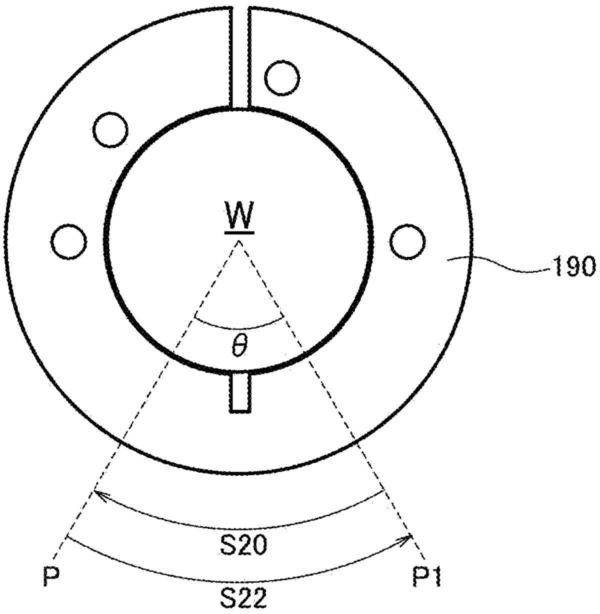
FIG. 9 is a schematic diagram of the rotating jig and the bar shown in FIG. 8 viewed from the back.
Figure 10A:
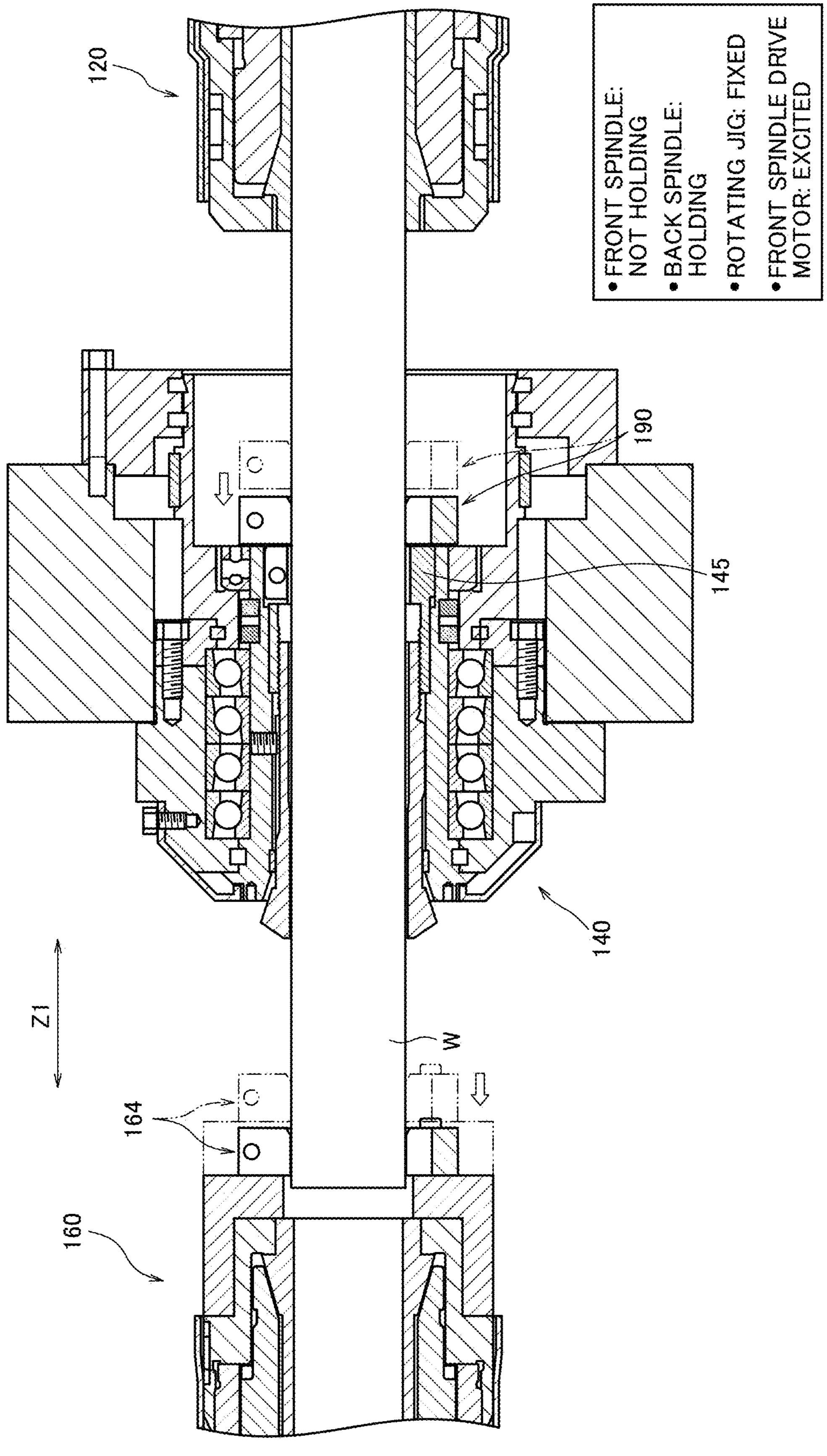
FIG. 10A is a schematic diagram showing a state in which the back spindle is moved backward and the rotating jig and adjusting nut are engaged.
Figure 10B:
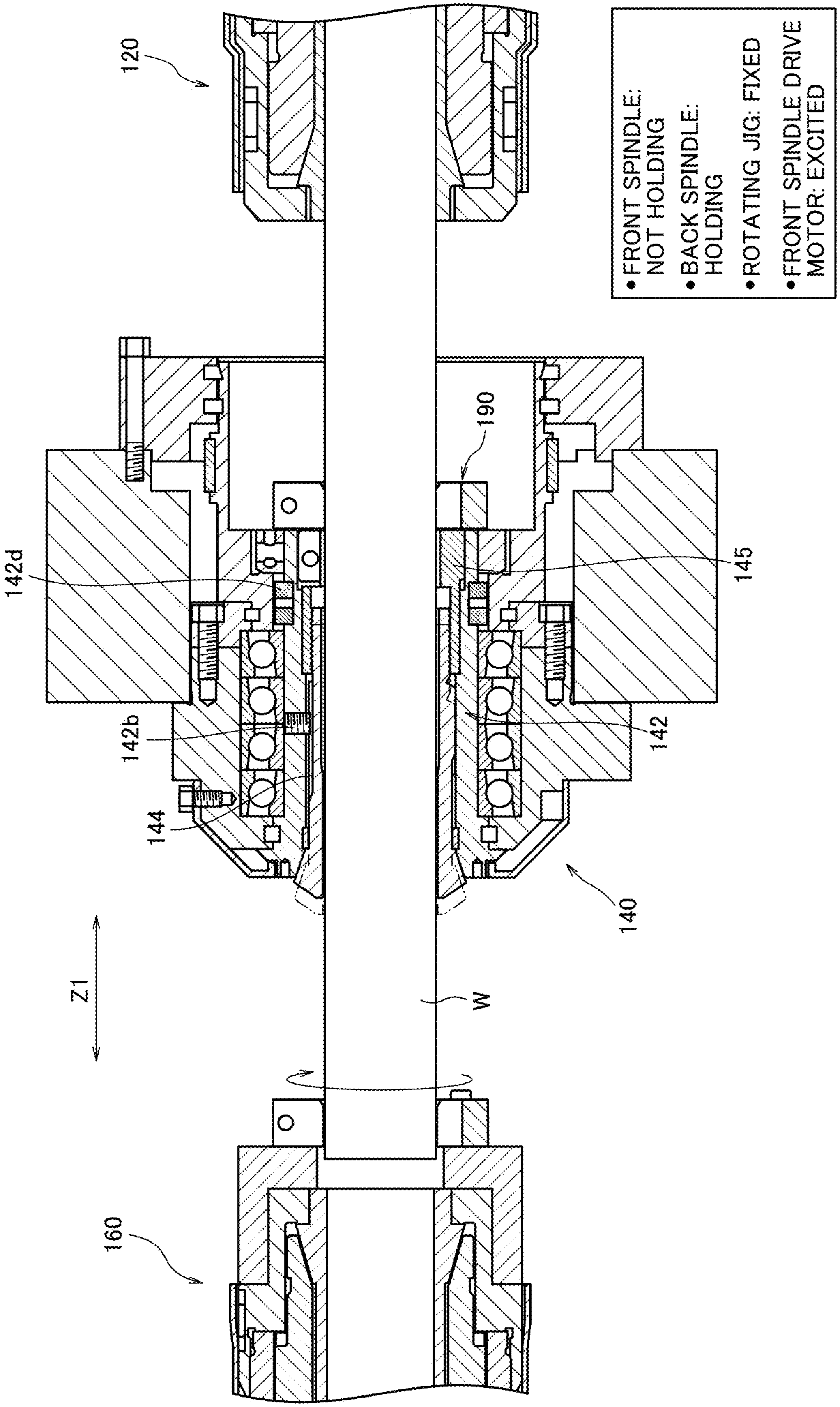
FIG. 10B is a schematic diagram illustrating the process of adjusting the size of the gap between the bar and the guide bush main body by rotating the back spindle.

Next, based on FIGS. 1 to 10B, an example of a procedure for adjusting the size of the gap between the bar W and the rotary guide bush 140, that is the gap between the bar W and the guide bush main body 144, using the machine tool 100 according to an example will be described. FIG. 6A is a flowchart showing a procedure for adjusting size of a gap between a bar and a rotary guide bush, FIG. 6B is a flowchart showing a preparation process shown in FIG. 6A, FIG. 6C is a flowchart showing a gap adjusting process shown in FIG. 6A, FIG. 7A is a schematic diagram showing a state in which the bar is inserted into a front spindle, FIG. 7B is a schematic diagram showing a state in which the bar is inserted up to the rotary guide bush, FIG. 7C is a schematic diagram showing a state in which the front spindle is moved forward and a rotating jig and an adjusting nut are engaged, FIG. 8 is a schematic diagram showing a state in which the rotating jig and the adjusting nut are disengaged, FIG. 9 is a schematic diagram of the rotating jig and the bar shown in FIG. 8 viewed from the back, FIG. 10A is a schematic diagram showing a state in which the back spindle is moved backward and the rotating jig and adjusting nut are engaged, FIG. 10B is a schematic diagram illustrating the process of adjusting the size of the gap between the bar and the guide bush main body by rotating the back spindle. The procedure described below is just an example, and the adjustment of the size of the gap between the bar W and the guide bush main body 144 is not limited to the procedure described below.

<3.1 Preparation Process>

(Step S10) First, the machine tool 100 performs a preparation process shown in FIG. 6B.

(Step S11) In the preparation process, the bar W is inserted from the rear end of the front spindle 120 using a push arrow of a bar feeder (not shown) (see FIG. 7A), and then inserted into the rotating jig 190 and the rotary guide bush 140 in this order. Here, the rotation center of the back spindle 160 is made coincide with the rotation center of the front spindle 120 and the rotation center of the rotary guide bush 140.

(Step S12) Next, as shown in FIG. 7B, the rotating jig 190 is tightened and fixed to the bar W, so that the rotating jig 190 and the bar W become to be integrally rotated around the rotation axis L. When fixing the rotating jig 190 to the bar W, the distance D1 from the rotating jig 190 to the adjusting nut 145 of the rotary guide bush 140 is longer than the distance D2 from the bar W to the holding jig 164 of the back spindle 160.

(Step S13) Next, the bar W is pushed out until the engagement pin 192 of the rotating jig 190 is inserted into the engagement hole 145*b*1 of the adjusting nut 145 of the rotary guide bush 140. By inserting the engagement pin 192 of the rotating jig 190 into the engagement hole 145*b*1 of the adjusting nut 145 of the rotary guide bush 140, the orientation of the adjusting nut 145, that is, the orientation of the guide bush main body 144, is set in a predetermined direction. Further, when the engagement pin 192 of the rotating jig 190 is inserted into the engagement hole 145*b*1 of the adjusting nut 145 of the rotary guide bush 140, since the distance D1 from the rotating jig 190 to the adjusting nut 145 of the rotary guide bush 140 is longer than the distance D2 from the bar W to the holding jig 164 of the back spindle 160, if the inner diameter φ of the holding jig 164 of the back spindle 160 is sufficiently large, the bar W can be inserted into the holding jig 164 of the back spindle 160 as shown in FIG. 7C.

When pushing out the bar W, if the positions of the engagement hole 145*b*1 of the adjusting nut 145 and the engagement pin 192 of the rotating jig 190 are misaligned in the rotational direction, the bar W (that is, the front spindle 120 that holds the bar W) is rotated until the engagement hole 145*b*1 of the adjusting nut 145 and the engagement pin 192 of the rotating jig 190 directly oppose each other.

(Step S14) Next, in this state, the holding jig 164 is tightened to the bar W by the adjusting bolt 164*e* of the holding jig 164 of the back spindle 160 and the bar W is gripped (held) by the back spindle 160.

(Step S15) Next, the excitation of the front spindle drive motor 123 of the front spindle 120, which is an electric motor, is cut off, and the back spindle 160 is moved forward toward the rotary guide bush 140 until the rotating jig 190 is disengaged from the adjusting nut 145 to be in a state shown in FIG. 8.

<3.2 Inspection Process>

(Step S20) Next, in this state, the back spindle 160 is rotated by a predetermined angle in the predetermined direction. That is, as shown in FIG. 9, the back spindle 160 is rotated to rotate the bar W by a predetermined angle θ from a reference angular position P to the angular position P1.

(Step S21) Here, if the excitation of the front spindle drive motor 123 is cut off, the rotation of the timing pulley 146 of the rotary guide bush 140 can rotate the front spindle drive motor 123 of the front spindle 120 via the timing belts V1 and V2.

Therefore, as described above, if the gap between the bar W and the guide bush main body 144 is narrow when the bar W is rotated by the predetermined angle θ from the reference angular position P to the angular position P1, the bar W and the guide bush main body 144 may be in contact with each other, and this contact may cause the guide bush main body 144 to rotate with the bar W. This rotation of the guide bush main body 144 rotates the guide bush sleeve 142, which is integrated with the guide bush main body 144 by the set screw 142*b*, and the timing pulley 146 is rotated, which engages with the key 142*d* embedded in the guide bush sleeve 142. The rotation of the timing pulley 146 is transmitted from the timing belt V2 to the counter shaft 134, from the counter shaft 134 to the timing belt V1, from the timing belt V1 to the front spindle main body 122 of the front spindle 120, and from the front spindle main body 122 to the front spindle drive motor 123, so that the front spindle drive motor 123 rotates.

Conversely, if the gap between the bar W and the guide bush main body 144 is too large when the bar W is rotated by the predetermined angle θ from the reference angular position P to the angular position P1, the bar W and the guide bush main body 144 may not be in contact with each other and the guide bush main body 144 may not rotate.

Therefore, in step S21, it is determined whether the rotation angle of the front spindle drive motor 123 is within a predetermined angle range.

If the rotation angle of the front spindle drive motor 123 falls within a predetermined angle range, the gap between the bar W and the guide bush main body 144 is assumed to be the optimum gap size, and the adjustment of the size of the gap between the bar W and the guide bush main body 144 is completed.

On the other hand, if the rotation angle of the front spindle drive motor 123 is less than the lower limit of the predetermined angle range, since the gap between the bar W and the guide bush main body 144 is too large, it is determined it is necessary to adjust the size of the gap between the bar W and the guide bush main body 144, and the process proceeds to step S22, and the size of the gap between the bar W and the guide bush main body 144 is adjusted. Further, if the rotation angle of the front spindle drive motor 123 exceeds the upper limit of the predetermined angle range, since the size of the gap between the bar W and the guide bush main body 144 is too small, it is determined it is necessary to adjust the size of the gap between the bar W and the guide bush main body 144, and the process proceeds to step S22, and the size of the gap between the bar W and the guide bush main body 144 is adjusted.

(Step S22) First, the back spindle 160 is rotated to rotate the bar W from the angular position P1 until the bar W returns to the reference angular position P (that is, reverse rotation of step S20). After that, the process proceeds to step S30, and the size of the gap between the bar W and the guide bush main body 144 is adjusted.

<3.3 Gap Adjustment Process>

(Step S30) Next, steps of the gap adjustment process shown in FIG. 6C are performed.

(Step S31) First, the back spindle 160 is moved backward until the rotating jig 190 is inserted into the adjusting nut 145 of the rotary guide bush 140 to be in a state shown in FIG. 10A.

(Step S32) Next, the front spindle drive motor 123 is excited. In this way, a holding torque acts on the front spindle drive motor 123, and this holding torque affects the timing pulley 146 of the rotary guide bush 140, so that even if an attempt is made to rotate the timing pulley 146, the timing pulley 146 will not rotate.

(Step S33) As shown in FIG. 10B, in this state where the bar W is held by the back spindle 160, the back spindle 160 is rotated by a predetermined amount in a predetermined direction based on the output result from the guide bush opening degree determining section 181*b*. This rotation of the back spindle 160 rotate the bar W, and the rotating jig 190 fixed to the bar W to rotate by a predetermined amount in a predetermined direction.

Here, since the timing pulley 146 does not rotate, the guide bush sleeve 142, which is engaged with the timing pulley 146 via the key 142*d*, and the guide bush main body 144, which is engaged with the guide bush sleeve 142 via the set screw 142*b*, also do not rotate. However, when the rotating jig 190 rotates, the adjusting nut 145 that engages with the rotating jig 190 is rotated, and since the adjusting nut 145 cannot move in the Z direction due to the guide bush sleeve 142 and the rotating jig 190, the guide bush main body 144 screwed into the adjusting nut 145 is moved forward or backward in the Z direction relative to the guide bush sleeve 142 and the adjusting nut 145 in accordance with the rotational direction of the adjusting nut 145, so that the size of the gap between the bar W and the guide bush main body 144 is adjusted.

(Step S34) After the size of the gap between the bar W and the guide bush main body 144 is changed by a predetermined amount, the back spindle 160 is moved forward to disengage the rotating jig 190 from the adjusting nut 145 of the rotary guide bush 140, and the process returns to step S20.

Thereafter, the steps described above are repeated as appropriate until the rotation angle of the front spindle drive motor 123 falls within the predetermined angle range.

According to the machine tool 100 described above, the change in the rotation angle of the front spindle 120, which is rotatable when the back spindle 160 holding the bar W is rotationally driven, is based only on the rotation of the bar W accompanying the rotational drive of the back spindle 160. Thus, the SN ratio is improved compared to the case where the size of the gap between the rotary guide bush and the bar is adjusted based on the load of the back spindle drive motor when the back spindle holding the bar is rotationally driven by the back spindle drive motor, and in the case where the opening degree of the rotary guide bush 140 is adjusted by the adjusting nut 145 and the rotary guide bush 140 rotates synchronously with the front spindle 120, the gap between the rotary guide bush 140 and the bar W can be automatically adjusted with high precision.

In addition, the holding jig 164 for holding the bar W is detachably mounted on the back spindle 160. Thereby, the holding jig 164 mounted on the back spindle 160 holds the bar W. Thus, even if the back spindle 160 cannot directly hold the bar W, the bar W can be indirectly held by the back spindle 160 by selecting the holding jig 164 corresponding to the bar W.

Further, the rotating jig 190 that engages with the adjusting nut 145 of the rotary guide bush 140 facing the front spindle 120 and rotates the adjusting nut 145 is mounted on the bar W between the front spindle 120 and the rotary guide bush 140. Thereby, in a state where the bar W is held by the back spindle 160 and the rotating jig 190 is engaged with the adjusting nut 145, the back spindle 160 rotates the bar W to rotate the adjusting nut 145 of the rotary guide bush 140. Thus, the gap between the rotary guide bush 140 and the bar W can be automatically adjusted with high precision.

MODIFIED EXAMPLE

The machine tool according to an example of has been described above, the machine tool is not limited to the machine tool in the example described above.

For example, in the example described above, the front spindle drive motor 123 is placed on the spindle headstock 121, but the front spindle drive motor 123 does not need to be provided on the spindle headstock. 121, and for example, the front spindle drive motor 123 may be placed on the bed and rotationally drive the front spindle main body via a transmission mechanism. The same applies to the back spindle drive motor.

For example, in the example described above, timing belts are used for synchronous rotation of the front spindle 120 and the rotary guide bush 140, but this example is not intended to be limiting. According to one or more embodiments, the front spindle 120 and the rotary guide bush 140 are structurally connected to each other so that the front spindle 120 and the rotary guide bush 140 rotate synchronously.

Further, as described below, the front spindle 120 and the rotary guide bush 140 may be electrically connected so that the front spindle 120 and the rotary guide bush 140 rotate synchronously.

Figure 11:
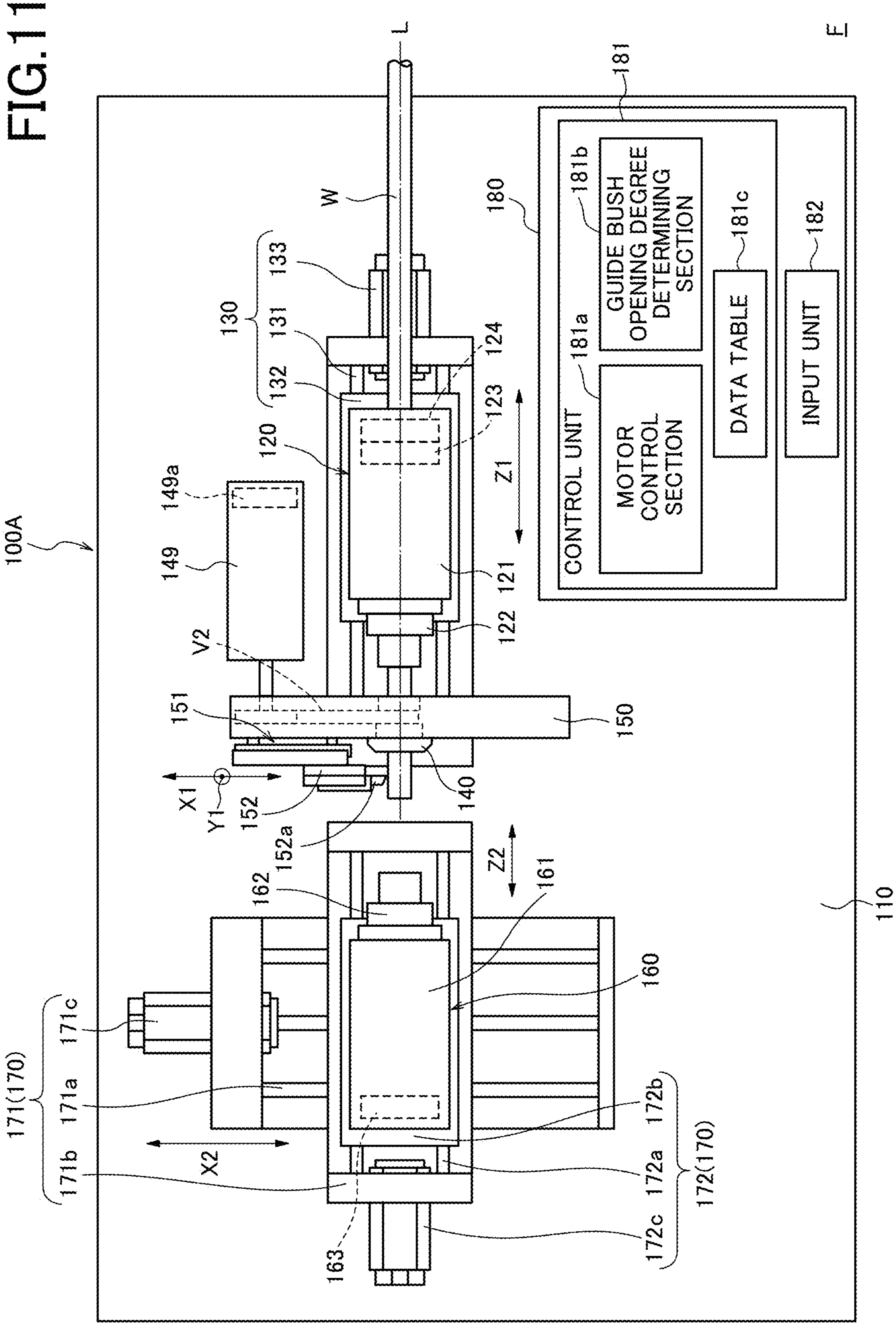
FIG. 11 is a schematic configuration diagram of an automatic lathe in a modified example of a machine tool according to one or more embodiments.

That is, as shown in FIG. 11, which is a schematic configuration diagram of an automatic lathe in a modified example, a machine tool 100A may not include the encoder 124 and the counter shaft 134 unlike the machine tool 100 described above, and a rotary guide bush drive motor 149 for rotating the guide bush main body 144 of the rotary guide bush 140 is provided on the bed 110, and the timing belt V2 is wound around a timing pulley provided at the tip of the rotary guide bush drive motor 149. The rotary guide bush drive motor 149 is an electric motor like the front spindle drive motor 123, and has an encoder 149*a* that detects the rotation angle of the rotary guide bush drive motor 149.

Further, the motor control section 181*a* of the control device 180 controls not only the operation of the front spindle drive motor 123 but also the operation of the rotary guide bush drive motor 149. In this modified example, the motor control section 181*a* synchronizes the rotational drive of the front spindle drive motor 123 and the rotational drive of the rotary guide bush drive motor 149.

In the machine tool 100A, the size of the gap between the bar W and the rotary guide bush 140 is adjusted by detecting the rotation angle of the rotary guide bush drive motor 149 instead of the front spindle drive motor 123. Regarding the procedure for adjusting the size of the gap between the bar W and the rotary guide bush 140, the target to be detected is the rotation angle of the rotary guide bush drive motor 149, and the target to be excited in step S32 is the rotary guide bush drive motor 149. Except for this configuration, the procedure is the same as the procedure for adjusting the size of the gap between the bar W and the rotary guide bush 140 using the machine tool 100 described above.

According to the machine tool 100A configured in this way, the machine tool 100A includes the guide bush opening degree determining section 181*b* that determines the adjustment amount of the gap based on the rotation angle of the rotary guide bush drive motor 149 when the back spindle 160 is rotated in a state where the bar W is held by the back spindle 160 and where the rotary guide bush drive motor 149 and the front spindle drive motor 123 are not excited. Thereby, the change in the rotation angle of the rotary guide bush drive motor 149, which is rotatable when the back spindle 160 holding the bar W is rotationally driven, is based only on the rotation of the bar W accompanying the rotational drive of the back spindle 160. Thus, the SN ratio is improved compared to the case where the size of the gap between the rotary guide bush and the bar W is adjusted based on the load of the back spindle drive motor when the back spindle holding the bar is rotationally driven by the back spindle drive motor, and in the case where the opening degree of the rotary guide bush 140 is adjusted by the adjusting nut 145 and the rotary guide bush 140 rotates synchronously with the front spindle 120, the gap between the rotary guide bush 140 and the bar W can be automatically adjusted with high precision and with a simple structure.

REFERENCE SIGNS LIST

100 machine tool
100A machine tool
110 bed
120 front spindle
121 spindle headstock
122 front spindle main body
122*a* chuck
122*b* timing pulley
123 front spindle drive motor
124 encoder
130 front spindle feeding mechanism
131 Z1 rail
132 Z1 slider
133 Z1 motor
134 counter shaft
134*a* spindle side timing pulley
134*b* rotary guide bush side timing pulley
140 rotary guide bush
141 guide bush holder
141*a* guide bush holder main body
141*b* bearing holder
142 guide bush sleeve
142*a* taper
142*b* set screw
142*c* through screw hole
142*d* key
143 bearing
144 guide bush main body
144*a* male thread
144*b* slot
144*c* taper
144*d* groove
145 adjusting nut
145*a* female thread
145*b* back surface
145*b*1 engagement hole
146 timing pulley
146*a* key groove
146*b* belt positioning groove
147 retaining nut
148 flange
149 rotary guide bush drive motor
149*a* encoder
150 guide bush support
150*a* rotary guide bush insertion hole
151 tool rest moving mechanism
152 tool rest
152*a* cutting tool
160 back spindle
161 spindle headstock
162 back spindle main body
162*a* chuck
163 back spindle drive motor
164 holding jig
164*a* spindle mounting tool
164*al* front surface
164*b* bar holder
164*b*1 screw hole
164*c* connecting bolt
164*d* tightening bolt
164*e* adjusting bolt
170 back spindle feeding mechanism
171 X2 direction feeding structure
171*a* X2 rail
171*b* X2 slider
171*c* X2 motor
172 Z2 direction feeding structure
172*a* Z2 rail
172*b* Z2 slider
172*c* Z2 motor
180 control device
181 control unit
181*a* motor control section
181*b* guide bush opening degree determining section
181*c* data table
182 input unit
190 rotating jig
190*a* screw hole
190*b* front surface
191 tightening bolt
192 engagement pin
W bar
F floor
L rotation axis
φ inner diameter of bar holder
V1, V2 timing belt
D1 distance from rotating jig to adjusting nut
D2 distance from bar to holding jig
B fixing bolt
P reference angle position

The invention claimed is:

1. A machine tool comprising:

a front spindle that rotatably holds a bar;

a front spindle drive motor that rotationally drives the front spindle;

an encoder that detects a rotation angle of the front spindle drive motor;

a rotary guide bush that is installed on a guide bush support in front of the front spindle to support the bar extending from the front spindle while allowing the bar to rotate around a rotation axis and move in a rotation axis direction and rotate synchronously with the front spindle;

a back spindle that is arranged opposite to the front spindle and rotatably holds the bar;

a back spindle drive motor that rotationally drives the back spindle; and a controller that controls operations of the front spindle and the back spindle, wherein the rotary guide bush includes;

a guide bush holder that is fixed to the guide bush support;

a guide bush main body that is rotatable relative to the guide bush holder and supports the bar while allowing the bar to rotate around the rotation axis and move in the rotation axis direction; and an adjusting nut that, when adjusting a gap between the bar and the guide bush main body, rotates the guide bush main body to adjust size of the gap and is screwed with the guide bush main body, and wherein the controller includes a guide bush opening degree determining section that determines an adjustment amount of the gap based on a rotation angle of the front spindle when rotating the back spindle in a state where the bar is held by the back spindle and the front spindle drive motor is not excited.

2. The machine tool according to claim 1, wherein the back spindle is configured to attach and detach a holding jig that is configured to hold the bar.

3. The machine tool according to claim 1, wherein a rotating jig, which engages with the adjusting nut of the rotary guide bush facing the front spindle to rotate the adjusting nut, is mounted on the bar between the front spindle and the rotary guide bush.

4. The machine tool according to claim 2, wherein a rotating jig, which engages with the adjusting nut of the rotary guide bush facing the front spindle to rotate the adjusting nut, is mounted on the bar between the front spindle and the rotary guide bush.

5. A control method of a machine tool comprising:

a front spindle that rotatably holds a bar;

a front spindle drive motor that rotationally drives the front spindle;

an encoder that detects a rotation angle of the front spindle drive motor;

a rotary guide bush that is installed on a guide bush support in front of the front spindle to support the bar extending from the front spindle while allowing the bar to rotate around a rotation axis and move in a rotation axis direction and rotate synchronously with the front spindle;

a back spindle that is arranged opposite to the front spindle and rotatably holds the bar;

a back spindle drive motor that rotationally drives the back spindle; and a controller that controls operations of the front spindle and the back spindle, wherein the rotary guide bush includes:

a guide bush holder that is fixed to the guide bush support;

a guide bush main body that is rotatable relative to the guide bush holder and supports the bar while allowing the bar to rotate around the rotation axis and move in the rotation axis direction; and an adjusting nut that, when adjusting a gap between the bar and the guide bush main body, rotates the guide bush main body to adjust size of the gap and is screwed with the guide bush main body, wherein the control method comprises:

holding the bar with the back spindle;

rotating the back spindle around a rotation axis;

measuring the rotation angle of the front spindle drive motor caused by rotating the back spindle with the encoder;

determining an adjustment amount of the gap based on a rotation angle of the front spindle drive motor measured with the encoder; and rotating the guide bush main body relative to the adjusting nut by rotating the back spindle around a rotation axis so as to achieve the determined adjustment amount of the gap.

* * * * *